United States Patent [19]
Jenkins

[11] Patent Number: 5,130,496
[45] Date of Patent: Jul. 14, 1992

[54] AESTHETIC ELECTRICAL CORD COVER

[76] Inventor: Frank J. Jenkins, 1959 Linn Ln., Las Vegas, Nev. 89115

[21] Appl. No.: 785,051

[22] Filed: Oct. 30, 1991

[51] Int. Cl.⁵ ............................................... H02G 3/04
[52] U.S. Cl. ...................................... 174/135; 428/21; 428/919
[58] Field of Search .................... 174/135, 102 R, 91, 174/121 A, 136; 428/17, 21, 919

[56] References Cited

U.S. PATENT DOCUMENTS 1,435,311 11/1922 Knight .......................... 174/135 X
3,568,308 3/1971 Plaskon .................. 174/DIG. 8 X Primary Examiner—Leo P. Picard
Assistant Examiner—Hyung S. Sough
Attorney, Agent, or Firm—H. Jay Spiegel

[57] ABSTRACT

A device is disclosed which is designed to encase an electrical conductor to provide an aesthetic outer appearance. The device consists of an elongated tubular body having simulated leaves protruding outwardly from the outer surface of the body. A longitudinal split allows the body to be opened to receive the electrical conductor inside. Fastener structure is also provided to allow the body to be releasably fastened over the electrical conductor.

5 Claims, 1 Drawing Sheet

AESTHETIC ELECTRICAL CORD COVER

BACKGROUND OF THE INVENTION

The present invention relates to an aesthetic electrical cord cover. In the prior art, devices designed to cover electrical conductors are known, however, applicant is unaware of any such device including all of the features and aspects of the present invention.

a
The following prior art is known to Applicant:
U.S. Pat. No. 3,290,429 to Prescott et al. discloses an electrical conductor encased within a protective cover. The present invention differs from the teachings of Prescott et al. as contemplating a covering device which is easily removable and includes aesthetic features including simulated leaves.

U.S. Pat. No. 4,018,983 to Pedlow discloses a protective sheath designed to releasably cover items including electrical conductors. The present invention differs from the teachings of Pedlow as having fastening means which differs from the Pedlow fastening means and as including aesthetic structure including simulated leaves making the present invention resemble a vine.

U.S. Pat. No. 4,475,649 to Haarbosch discloses a storage case for an electrical cord including, in one embodiment thereof, a base and a pivoting cover. The present invention differs from the teachings of Haarbosch as contemplating outer aesthetic structure resembling a vine as well as relying upon the inherent flexibility of the body thereof to allow it to be opened and closed as opposed to the hinge structure of Haarbosch.

U.S. Pat. No. 4,650,925 to Coldren discloses a clamp for flat cable. This patent is believed to be of only general interest concerning the teachings of the present invention.

SUMMARY OF THE INVENTION

The present invention relates to an aesthetic electrical cord cover. The present invention includes the following interrelated objects, aspects and features:

(a) In a first aspect, the present invention includes a body designed to releasably attach over an existing electrical conductor. This structure includes a longitudinal slit allowing the body to be stretched open to allow insertion of the electrical conductor therein. Fastening means are provided to allow the device to be releasably fastened in covering configuration.

(b) In a further aspect, the outer appearance of the present invention has aesthetic features. Thus, the outer surface of the body has striations thereon resembling those which would be found in a vine. Furthermore, simulated leaves protrude outwardly from the body so that the entirety of the present invention resembles an elongated vine.

(c) The present invention not only covers an electrical conductor but protects it against damage while making electrical cords which normally are visible out in the open more aesthetically pleasing for viewers.

As such, it is a first object of the present invention to provide an aesthetic electrical cord cover.

It is a further object of the present invention to provide such a cover having the outward appearance of a vine.

It is a still further object of the present invention to provide such a device having releasable fastening means allowing it to be releasably fastened over an electrical conductor.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
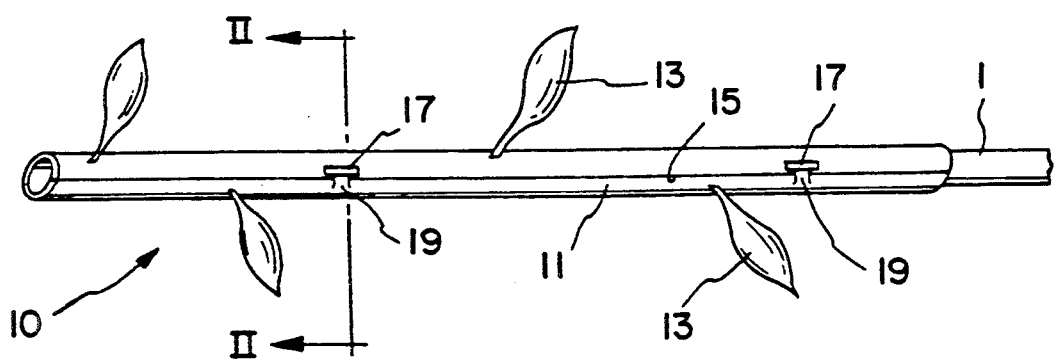
FIG. 1 shows a side view of the present invention.

With reference to FIG. 1, the present invention is generally designated by the reference numeral 10 and is seen to include a body 11 having a plurality of simulated leaves 13 protruding outwardly therefrom. As seen in FIG. 1, the outer texture of the body 11 has a plurality of longitudinally spaced striations which are designed to make the body 11 resemble an elongated stem. This appearance in conjunction with the simulated leaves 13 renders the present invention in close resemblance to an elongated vine.

Figure 2:
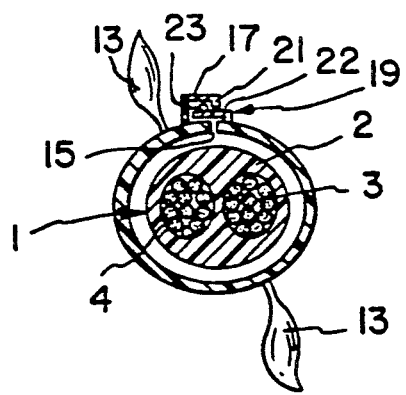
FIG. 2 shows a cross-sectional view along the line II-II of FIG 1.

As seen with reference to FIGS. 1 and 2, the body 11 has a longitudinal slit 15 extending throughout its length. This slit combined with the inherent flexibility of the materials from which the body 11 are made allows the body to be opened at the slit 15 to allow insertion of an electrical conductor 1.

With reference to FIG. 2, a typical electrical conductor 1 is seen to include an insulative outer covering 2 which encloses two electrical conductors 3, 4. The electrical conductor 1 depicted in FIG. 2 is merely exemplary of the types of electrical conductors which may suitably be enclosed in the inventive device 10.

With further reference to FIGS. 1 and 2, it is seen that the body 11 may be closed at the slit 15 by fastening means including a female receptacle 17 and a male portion 19. With particular reference to FIG. 2, it is seen that the female portion 17 has a downwardly depending lip 21 which catches a protruding tab 23 on the male portion 19. The male portion 19 includes a leg 22 which is flexible enough to allow pivoting motions so that, in the view of FIG. 2, the leg 22 may be pivoted in a counter-clockwise direction to free the tab 23 from the lip 21 to allow removal of the male portion 19 from the female portion 17 of the fastener.

With the above description in mind, the operation of the present invention should be self-evident. Depression of the respective legs 22 will allow release of the fasteners 17, 19 whereupon the split 15 may be opened due to the inherent resiliency of the body 11 to allow insertion of the electrical conductor 1 therein, whereupon, the edges of the split 15 may be moved into close adjacency with the fasteners 17, 19 being engaged as shown in FIG. 2, in particular, to fasten the inventive device 10 in the position shown in FIGS. 1 and 2.

In the preferred embodiment of the present invention, the body 11 may be made of any strong durable and resilient material such as, for example, rubber or any type of suitable plastic. Since the device 10 is designed to resemble a vine, preferably, the device is made in a green color. However, any suitable color may be employed as, of course, it is contemplated that the device 10 be made in a variety of colors to allow interior decorators to employ the present invention regardless of the color scheme in a room.

As such, an invention has been disclosed in terms of a preferred embodiment thereof, which fulfills each and every one of the objects of the present invention as set forth hereinabove and provides new and improved aesthetic electrical cord cover of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:
1. A cover for an electrical conductor, comprising:
   a) an elongated body having a longitudinal split;
   b) spaced fasteners allowing adjacent faces of said split to be selectively fastened in close adjacency; and
   c) a plurality of simulated leaves protruding outwardly from said body.
2. The invention of claim 1, wherein said body has an outer striated surface.
3. The invention of claim 1, wherein each of said spaced fasteners comprises:
   a) a female half having a downwardly depending lip; and
   b) a male half having a flexible leg with an upwardly facing tab;
   c) said body being made to resemble a vine.
4. The invention of claim 1, wherein said body is made of plastic.
5. The invention of claim 1, wherein said body is made rubber.

* * * * *